(12) United States Patent
Chidambaran et al.

(10) Patent No.: US 7,437,460 B2
(45) Date of Patent: Oct. 14, 2008

(54) SERVICE PLACEMENT FOR ENFORCING PERFORMANCE AND AVAILABILITY LEVELS IN A MULTI-NODE SYSTEM

(75) Inventors: Lakshminarayanan Chidambaran, Sunnyvale, CA (US); Christopher A. Kantarjiev, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 843 days.

(21) Appl. No.: 10/918,056

(22) Filed: Aug. 12, 2004

(65) Prior Publication Data

US 2005/0038829 A1 Feb. 17, 2005

Related U.S. Application Data

(60) Provisional application No. 60/495,368, filed on Aug. 14, 2003, provisional application No. 60/500,096, filed on Sep. 3, 2003, provisional application No. 60/500,050, filed on Sep. 3, 2003.

(51) Int. Cl.
*G06F 15/173* (2006.01)
*G06F 12/00* (2006.01)

(52) U.S. Cl. .................... 709/226; 718/105
(58) Field of Classification Search ............. 709/227, 709/226, 223–225, 250, 219; 718/105
See application file for complete search history.

(56) References Cited

U.S. PATENT DOCUMENTS

| | | | |
|---|---|---|---|
| 5,758,345 A | 5/1998 | Wang | |
| 5,774,668 A | 6/1998 | Choquier et al. | |
| 5,890,167 A | 3/1999 | Bridge, Jr. et al. | |
| 5,918,059 A | 6/1999 | Tavallaei et al. | |
| 5,951,694 A | 9/1999 | Choquier et al. | |
| 6,041,357 A | 3/2000 | Kunzelman et al. | |
| 6,088,728 A | 7/2000 | Bellemore et al. | |
| 6,178,529 B1 | 1/2001 | Short et al. | |
| 6,243,751 B1 | 6/2001 | Chatterjee et al. | |
| 6,272,503 B1 | 8/2001 | Bridge et al. | |
| 6,327,622 B1 | 12/2001 | Jindal et al. | |
| 6,556,659 B1 * | 4/2003 | Bowman-Amuah | ........ 379/9.04 |
| 6,587,866 B1 | 7/2003 | Modi et al. | |

(Continued)

FOREIGN PATENT DOCUMENTS

EP   0 942 363 A2   9/1999

(Continued)

OTHER PUBLICATIONS

Patent Cooperation Treaty, "Notification of Transmittal of the International Preliminary Report on Patentability," PCT/US2004/026405, dated Oct. 10, 2006, 7 pages.

(Continued)

*Primary Examiner*—Zarni Maung
(74) *Attorney, Agent, or Firm*—Hickman Palermo Truong & Becker

(57) ABSTRACT

An approach efficiently and dynamically places services within a multi-node system when expanding or contracting services, that is, increasing and decreasing the number of instances that host a service. Service placement decisions are made in a way that accounts for performance and availability requirements of both the service being placed and other services.

20 Claims, 6 Drawing Sheets

U.S. PATENT DOCUMENTS

| | | | |
|---|---|---|---|
| 6,601,101 | B1 | 7/2003 | Lee et al. |
| 6,728,748 | B1 | 4/2004 | Mangipudi et al. |
| 6,816,907 | B1 | 11/2004 | Mei et al. |
| 7,058,957 | B1 | 6/2006 | Nguyen |
| 7,174,379 | B2 * | 2/2007 | Agarwal et al. ............. 709/226 |
| 7,178,050 | B2 | 2/2007 | Fung et al. |
| 7,263,590 | B1 | 8/2007 | Todd et al. |
| 7,269,157 | B2 | 9/2007 | Klinker et al. |
| 2001/0056493 | A1 | 12/2001 | Mineo |
| 2002/0073139 | A1 | 6/2002 | Hawkins et al. |
| 2002/0129157 | A1 * | 9/2002 | Varsano ...................... 709/232 |
| 2002/0161896 | A1 | 10/2002 | Wen et al. |
| 2002/0194015 | A1 | 12/2002 | Gordon et al. |
| 2003/0005028 | A1 | 1/2003 | Dritschler et al. |
| 2003/0007497 | A1 | 1/2003 | March et al. |
| 2003/0088671 | A1 | 5/2003 | Klinker et al. |
| 2003/0108052 | A1 | 6/2003 | Inoue et al. |
| 2003/0135642 | A1 | 7/2003 | Benedetto et al. |
| 2003/0208523 | A1 * | 11/2003 | Gopalan et al. ............. 709/201 |
| 2004/0111506 | A1 | 6/2004 | Kundu et al. |
| 2004/0117794 | A1 | 6/2004 | Kundu |
| 2004/0176996 | A1 * | 9/2004 | Powers et al. .................. 705/11 |
| 2004/0268357 | A1 | 12/2004 | Joy et al. |
| 2005/0021771 | A1 | 1/2005 | Kaehn et al. |
| 2005/0165925 | A1 * | 7/2005 | Dan et al. ................... 709/224 |
| 2005/0239476 | A1 | 10/2005 | Betrabet et al. |
| 2005/0267965 | A1 | 12/2005 | Heller |
| 2006/0036617 | A1 | 2/2006 | Bastawala et al. |
| 2007/0226323 | A1 | 9/2007 | Halpern |

FOREIGN PATENT DOCUMENTS

| | | |
|---|---|---|
| EP | 0942363 A2 | 9/1999 |
| EP | 0 992 909 A2 | 4/2000 |
| EP | 1 170 662 A2 | 1/2002 |
| WO | WO 02/05116 A2 | 1/2002 |
| WO | WO 02/07037 A | 1/2002 |
| WO | WO 02/07037 A1 | 1/2002 |
| WO | WO 02/097676 A2 | 12/2002 |
| WO | WO 03/014928 A1 | 2/2003 |
| WO | WO 03/014928 A2 | 2/2003 |
| WO | WO 03/062983 A2 | 7/2003 |

OTHER PUBLICATIONS

Amended Claims, PCT/US2004/026405, dated Apr. 6, 2006, 4 pages (attached).

International Searching Authority, "Notification of Transmittal of the International Search Report and the Written Opinion of the International Searching Authority, or the Declaration," PCT/US2004/026405, dated Jan. 6, 2006, 13 pages.

Current Claims, PCT/US2004/026405, 7 pages, (Mar. 23, 2006).

International Searching Authority, "Notification of Transmittal of the International Preliminary Report on Patentability," PCT/US2004/026445, dated Dec. 12, 2005, 6 pages.

Claims as Amended, PCT/US2004/026445, Aug. 11, 2005, 4 pages (attached).

International Searching Authority, "Notification of Transmittal of the International Search Report and the Written Opinion of the International Searching Authority, or the Declaration," Aug. 4, 2005, 13 pages.

Current Claims for International Application No. PCT/US2004/026389, pp. 1-7.

Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.

European Patent Office, "International Preliminary Report on Patentability," Aug. 26, 2005, International Application No. PCT/US2004/026570, 9 pages.

International Searching Authority, "Notification of Transmittal of the International Search Report and the Written Opinion of the International Searching Authority, or the Declaration," Aug. 25, 2005, 12 pages.

Current Claims for International Application No. PCT/US2004/026445, pp. 1-5, (2004).

Henry Song, et al., "Browser State Repository Service," Lecture Notes in Computer Science, vol. 2414, 2002, pp. 1-14, XP002904339.

Eric Skow, et al., "A Security Architecture for Application Session Handoff," 2002, IEEE International Conference Proceedings, Apr. 28-May 2, 2002, vol. 1 of 5, pp. 2058-2063, XP010589848.

Chase, Jeffrey S., "Dynamic Virtual Clusters in a Grid Site Manager," Proceedings of the IEEE International Symposium on HPDC-2003, XP010463715, pp. 90-100, (2003).

International Searching Authority, "Notification of the Transmittal of the International Search Report and the Written Opinion of the International Searching Authority, or the Declaration", PCT/US2004/026405, dated Aug. 19, 2005, 5 pages.

Claims, PCT/US2004/026405, 7 pages, (2004).

International Preliminary Examining Authority, "Written Opinion of the International Preliminary Examining Authority," Jun. 7, 2005, 4 pages.

Current Claims of International Application No. PCT/US04/26570, 4 pages, (2004).

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

International Searching Authority, "Notification of Transmittal of the International Search Report and the Written Opinion of the International Searching Authority, or the Declaration," Nov. 12, 2004, 13 pages.

Current Claims of International Application No. PCT/US2004/026570, 4 pages, (2004).

Current Claims of International Application No. PCT/US2004/025805, 8 pages, (2004).

International Searching Authority, "Notification of Transmittal of the International Search Report and the Written Opinion of the International Searching Authority, or the Declaration," dated Dec. 3, 2004, 12 pages.

"Office Action" received in related case U.S. Appl. No. 10/917,661, filed Aug. 12, 2004, 9 pages.

"Office Action" received in related case U.S. Appl. No. 10/917,687, filed Aug. 12, 2004, 9 pages.

* cited by examiner

SERVICE PLACEMENT FOR ENFORCING PERFORMANCE AND AVAILABILITY LEVELS IN A MULTI-NODE SYSTEM

RELATED APPLICATIONS

The present application claims priority to U.S. Provisional Application No. 60/495,368, Computer Resource Provisioning, filed on Aug. 14, 2003, which is incorporated herein by reference; the present application claims priority to U.S. Provisional Application No. 60/500,096, Service Based Workload Management and Measurement in a Distributed System, filed on Sep. 3, 2003, which is incorporated herein by reference; the present application claims priority to U.S. Provisional Application No. 60/500,050, Automatic And Dynamic Provisioning Of Databases, filed on Sep. 3, 2003, which is incorporated herein by reference.

The present application is related to the following U.S. applications:

U.S. application Ser. No. 10/718,747, Automatic and Dynamic Provisioning of Databases, filed on Nov. 21, 2003, which is incorporated herein by reference;

U.S. application Ser. No. 10/917,873, Hierarchical Management of the Dynamic Allocation of Resources in a Multi-Node System, filed by Benny Souder, et al. on the equal day herewith, and incorporated herein by reference;

U.S. application Ser. No. 10/917,953, Transparent Session Migration Across Servers, filed by Sanjay Kaluskar, et al. on the equal day herewith and incorporated herein by reference;

U.S. application Ser. No. 10/917,661, Calculation of Service Performance Grades in a Multi-Node Environment That Hosts the Services, filed by Lakshminarayanan Chidambaran, et al. on the equal day herewith and incorporated herein by reference;

U.S. application Ser. No. 10/918,055, Incremental Run-Time Session Balancing in a Multi-Node System, filed by Lakshminarayanan Chidambaran, et al. on the equal day herewith and incorporated herein by reference;

U.S. application Ser. No. 10/917,687, On Demand Node and Server Instance Allocation and De-Allocation, filed by Lakshminarayanan Chidambaran, et al. on the equal day herewith and incorporated herein by reference;

U.S. application Ser. No. 10/918,054, Recoverable Asynchronous Message Driven Processing in a Multi-Node System, filed by Lakshminarayanan Chidambaran, et al. on the equal day herewith and incorporated herein by reference; and U.S. application Ser. No. 10/917,715, Managing Workload by Service, filed by Carol Colrain, et al. on the equal day herewith and incorporated herein by reference.

FIELD OF THE INVENTION

The present invention relates to work load management, and in particular, work load management within a multi-node computer system.

BACKGROUND OF THE INVENTION

Enterprises are looking at ways of reducing costs and increasing efficiencies of their data processing system. A typical enterprise data processing system allocates individual resources for each of the enterprise's applications. Enough resources are acquired for each application to handle the estimated peak load of the application. Each application has different load characteristics; some applications are busy during the day; some others during the night; some reports are run once a week and some others once a month. As a result, there is a lot of resource capacity that is left unutilized. Grid computing enables the utilization or elimination of this unutilized capacity. In fact, grid computing is poised to drastically change the economics of computing.

A grid is a collection of computing elements that provide processing and some degree of shared storage; the resources of a grid are allocated dynamically to meet the computational needs and priorities of its clients. Grid computing can dramatically lower the cost of computing, extend the availability of computing resources, and deliver higher productivity and higher quality. The basic idea of grid computing is the notion of computing as a utility, analogous to the electric power grid or the telephone network. A client of the grid does not care where its data is or where the computation is performed. All a client wants is to have computation done and have the information delivered to the client when it wants.

This is analogous to the way electric utilities work; a customer does not know where the generator is, or how the electric grid is wired. The customer just asks for electricity and gets it. The goal is to make computing a utility—a ubiquitous commodity. Hence it has the name, the grid.

This view of grid computing as a utility is, of course, a client side view. From the server side, or behind the scenes, the grid is about resource allocation, information sharing, and high availability. Resource allocation ensures that all those that need or request resources are getting what they need. Resources are not standing idle while requests are left unserviced. Information sharing makes sure that the information clients and applications need is available where and when it is needed. High availability ensures that all the data and computation must always be there—just as a utility company must always provide electric power.

Grid Computing for Databases

One area of computer technology that can benefit from grid computing is database technology. A grid can support multiple databases and dynamically allocate and reallocate resources as needed to support the current demand for each database. As the demand for a database increases, more resources are allocated for that database, while other resources are deallocated from another database. For example, on an enterprise grid, a database is being serviced by one database server running on one server blade on the grid. The number of users requesting data from the database increases. In response to this increase in the demand for the database, a database server for another database is removed from one server blade and a database server for the database experiencing increased user requests is provisioned to the server blade.

Grid computing for databases can require allocation and management of resources at different levels. At a level corresponding to a single database, the performance provided to the users of the database must be monitored and resources of the database allocated between the users to ensure performance and resource availability goals for each of the users are met. Between databases, the allocation of a grid's resources must be managed to ensure that performance and resource availability goals for users of all the databases are met. The work to manage allocation of resources at these different levels and the information needed to perform such management is very complex. Therefore, there is a need for a mechanism that simplifies and efficiently handles the management of resources in a grid computing system for database systems as well as other types of systems that allocate resources at different levels within a grid.

One such mechanism is the system described in Hierarchical Management Of The Dynamic Allocation Of Resources In A Multi-Node System (50277-2382), which uses a hierarchy of directors to manage resources at different levels. One type of director, a database director, manages resources allocated to a database among users of the database. For example, a grid may host a group of database servers for a database. Each database server in the group is referred to as a database instance. Each database instance hosts a number of database sessions for users and one or more services. The database director manages the allocation of database instances among the users and services.

A service is work of a particular type or category that is hosted for the benefit of one or more clients. A service includes any use or expenditure of computer resources, including, for example, CPU processing time, storing and accessing data in volatile memory, read and writes from and to persistent storage (i.e. disk space), and use of network or bus bandwidth. A service may be, for example, work that is performed for a particular application on a client of a database server.

For a database, a subset of the group of database instances is allocated to provide a particular service. A database instance allocated to provide the service is referred to herein as hosting the service. A database instance may host more than one service.

The performance or resource availability realized by a service may at times not meet goals for the service. When this occurs, an additional database instance may be assigned to host the service or an already assigned database instance hosting the service may be unassigned. The process of assigning and unassigning database instances in this way is referred to herein as service placement.

Based on the foregoing, it is desirable to have an approach for service placement that accounts for and accommodates goals for performance and availability of resources of all the services of a database, and that may involve expanding some services and contracting other services.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for managing the allocation of resources in a multi-node environment is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is an approach for efficiently and dynamically placing services when expanding or contracting services, that is, increasing and decreasing the number of instances that host a service. Service placement decisions are made in a way that accounts for performance and availability requirements of both the service being placed and other services.

Service placement and service placement decisions are made under a variety of scenarios. The load of a service may increase and another instance needs to be selected to which expand the service. The load of a service may go down, requiring that the service be contracted and a database instance be selected from which to remove the service. A high availability event, such as the loss of a node or database instance that hosts a service, requires compensating for the loss by selecting a replacement node or database instance. An administrator may increase the minimum number of instances that should host a service, requiring that a service be expanded, or may decrease the maximum number of instances that should host the service, requiring that a service be contracted.

Illustrative Multi-Node System

Figure 1:
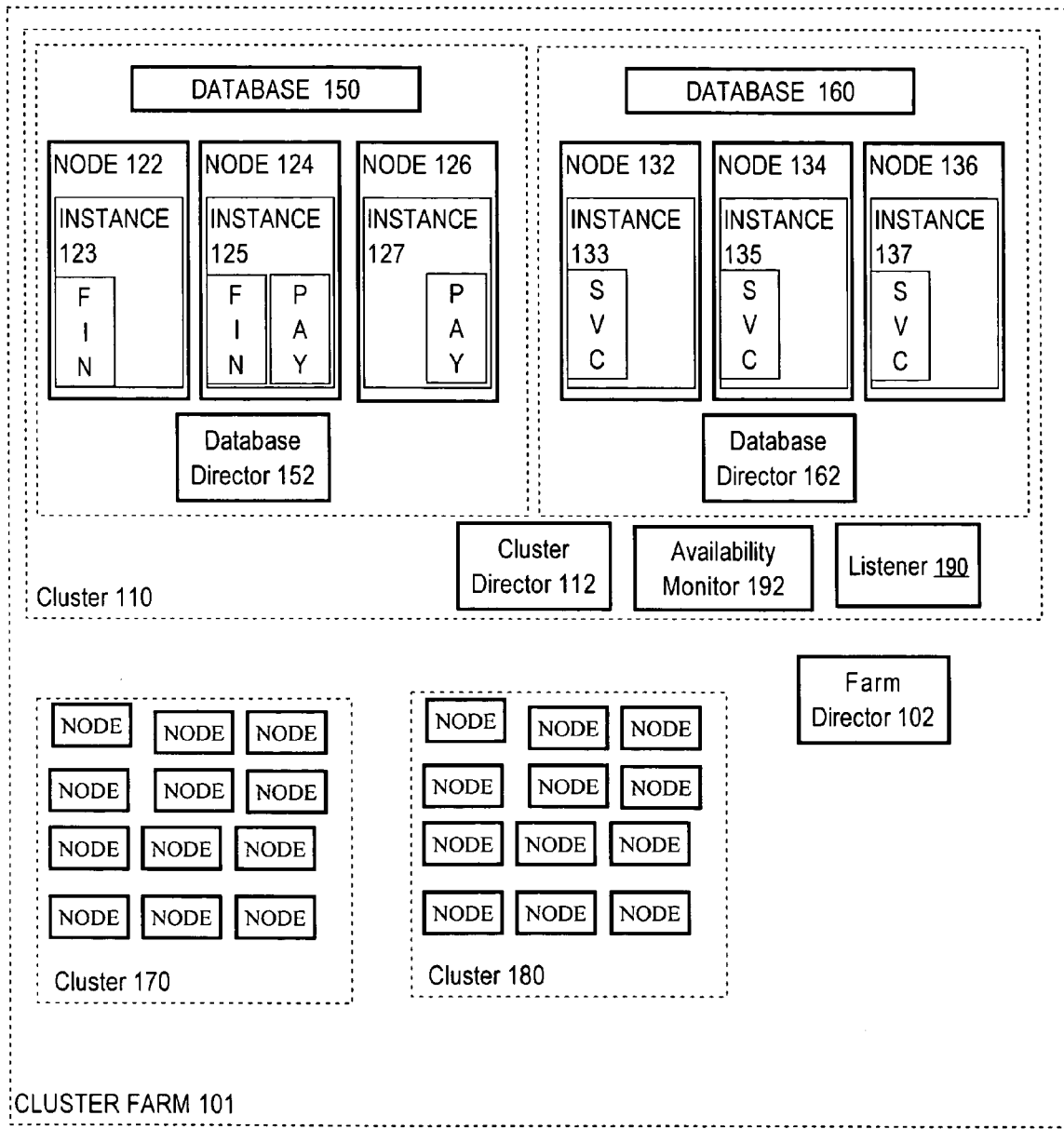
FIG. 1 is a block diagram showing a multi-node computer system on which an embodiment of the present invention may be implemented.

FIG. 1 shows a multi-node computer system that may be used to implement an embodiment of the present invention. Referring to FIG. 1, it shows cluster farm 101. A cluster farm is a set of nodes that is organized into groups of nodes, referred to as clusters. Clusters provide some degree of shared storage (e.g. shared access to a set of disk drives) between the nodes in the cluster. Cluster farm 101 includes clusters 110, 170, and 180. Each of the clusters hosts one or more multi-node database servers that provide and manage access to databases. The nodes in a cluster farm may be in the form of computers (e.g. work stations, personal computers) interconnected via a network, and may be part of a grid.

Clusters and Multi-Node Database Servers

Clusters 110, 170, and 180 host one or more multi-node database servers. Cluster 110 hosts a multi-node database server for database 150, the multi-node database server comprising database instances 123, 125, and 127, which are hosted on nodes 122, 124, and 126, respectively. Cluster 110 also hosts a multi-node database server for database 160, the multi-node database server comprising database instances 133, 135, and 137 hosted on nodes 132, 134, and 136, respectively.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to a particular database, processing requests by clients to access the database.

Resources from multiple nodes in a multi-node computer system can be allocated to running a particular server's software. Each combination of the software and allocation of the resources from a node is a server that is referred to herein as a "server instance" or "instance". Thus, a multi-node server comprises multiple server instances that can run on multiple nodes. Several instances of a multi-node server can even run on the same node. A multi-node database server comprises multiple "database instances", each database instance running on a node, and governing and facilitating access to a particular database. Database instances 123, 125, and 127 are instances of the same multi-node database server.

Services

As mentioned before, a service is work of a particular type or category that is hosted for the benefit of one or more clients. One type of service is a database service. Cluster 110 provides a database service for accessing database 150 and a database service for accessing database 160. In general, a database service is work that is performed by a database server for a client, work that typically includes processing queries that require access to a particular database.

Like any service, a database service may be further categorized. Database services for database 150 are further categorized into the FIN service and PAY service. The FIN service is the database service performed by database instances 123 and 125 for the FIN application. Typically, this service involves accessing database objects on database 150 that store database data for the FIN application. The PAY services are database services performed by database instances 125 and 127 for the PAY application. Typically, this service involves accessing database objects on database 150 that store database data for the PAY application.

Sessions

In order for a client to interact with a database server on cluster 110, a session is established for the client. A session, such as a database session, is a particular connection established for a client to a server, such as a database instance, through which the client issues a series of requests (requests for execution of database statements). For each database session established on a database instance, session state data is maintained that reflects the current state of a database session. Such information contains, for example, the identity of the client for which the session is established, and temporary variable values generated by processes executing software within the database session.

A client establishes a database session by transmitting a database connection request to cluster 110. A listener, such as listener 190, receives the database connection request. Listener 190 is a process running on cluster 110 that receives client database connection requests and directs them to a database instance within cluster 110. The client connection requests received are associated with a service (e.g. service FIN and PAY). The client request is directed to a database instance hosting the service, where a database session is established for the client. Listener 190 directs the request to the particular database instance and/or node in a way that is transparent to the application. Listener 190 may be running on any node within cluster 110. Once the database session is established for the client, the client may issue additional requests, which may be in the form of function or remote procedure invocations, and which include requests to begin execution of a transaction, to execute queries, to perform updates and other types of transaction operations, to commit or otherwise terminate a transaction, and to terminate a database session.

Monitoring Workload

Resources are allocated and re-allocated to meet levels of performance and cardinality constraints on the resources. Levels of performance and resource availability established for a particular service are referred to herein as service-level agreements. Levels of performance and cardinality constraints on resources that apply to a multi-node system in general and not necessarily to a particular service are referred to herein as policies. For example, a service-level agreement for service FIN maybe require as a level of performance that the average transaction time for service FIN be no more than a given threshold, and as an availability requirement that at least two instances host service FIN. A policy may require that the CPU utilization of any node should not exceed 80%.

Policies may also be referred to herein as backend policies because they are used by backend administrators to manage overall system performance and to allocate resources between a set of services when it is deemed there are insufficient resources to meet service-level agreements of all the set of services. For example, a policy assigns a higher priority to a database relative to another database. When there are insufficient resources to meet service-level agreements of services of both databases, the database with the higher priority, and the services that use the database, will be favored when allocating resources.

To meet service-level agreements, a mechanism is needed to monitor and measure workload placed on various resources. These measures of workload are used to determine whether service-level agreements are being met and to adjust the allocation of resources as needed to meet the service-level agreements.

According to an embodiment of the present invention, a workload monitor is hosted on each database instance and generates "performance metrics". Performance metrics is data that indicates the level of performance for one or more resources or services based on performance measures. Approaches for performing these functions are described in Managing Workload by Service (50277-2337). The information generated is accessible by various components within multi-node database server 222 that are responsible for managing the allocation of resources to meet service-level agreements, as shall be described in greater detail later.

A performance metric of a particular type that can be used to gauge a characteristic or condition that indicates a level of performance or workload is referred to herein as a performance measure. A performance measure includes for example, transaction execution time or percent of CPU utilization. In general, service-level agreements that involve levels of performance can be defined by thresholds and criteria that are based on performance measures.

For example, execution time of a transaction is a performance measure. A service-level agreement based on this measure is that a transaction for service FIN should execute within 300 milliseconds. Yet another performance measure is percentage CPU utilization of a node. A backend policy based on this measure is that a node experience no more than 80% utilization.

Performance metrics can indicate the performance of a cluster, the performance of a service running on a cluster, a node in the cluster, or a particular database instance. A performance metric or measure particular to a service is referred to herein as a service performance metric or measure. For example, a service performance measure for service FIN is the transaction time for transactions executed for service FIN.

According to an embodiment, service-level agreement is based on the following.

Cardinality

This can be used by the backend administrator to restrict the maximum resources that can be consumed by a particular service and also to enforce that some minimum level of resources are available to be consumed by the service. For example, a service cardinality constraint requires that there be a minimum and/or maximum number of database instances that host a service; an instance cardinality constraint requires that there be a minimum and/or maximum number of database instances for a database. Cardinality constraints can also limit the number of nodes in a cluster.

Service or Database Priority

Some services or databases may be designated as having a higher priority than others. Preference is given to higher priority services or databases when allocating resources, particularly when there are insufficient resources to meet service-level agreements of all of a set of services or databases. Priority information may be supplied by database administrators.

$T_{cpu}$ Percent CPU utilization of the destination node for service expansion.

$X_{cpu}$ A backend policy in the form of a threshold CPU utilization for a node. $X_{cpu}$ may be different for different nodes.

Availability is the minimum number of resources that should be available at a particular moment. Availability is monitored by daemon processes referred to as availability monitors. In general, there is an availability monitor on every node that monitors the health of the instance and services on that node. Availability monitors, such as availability monitor 192, are daemons that detect when a node or database instance becomes unavailable due to, for example, a system crash. When detecting that a node or database instance has become unavailable, an availability monitor informs a database director and/or cluster director of the affected services and nodes. The directors initiate actions to achieve compliance to availability requirements. For example, an availability requirement requires that PAY be hosted on at least two database instances. Availability monitor 192 detects that instance 125 has gone down and informs database director 152. In response, database director 152 initiates service expansion to expand service PAY to a second running database instance, database instance 123.

Hierarchy of Directors

A hierarchy of directors, such as that described in Hierarchical Management Of The Dynamic Allocation Of Resources In A Multi-Node System (50277-2382), is used to dynamically adjust the allocation of resources within cluster farm 101 to meet service-level agreements. Cluster farm 101 includes a database director for each database managed by a database server on cluster farm 101, a cluster director for each cluster within cluster farm 101, and a farm director for cluster farm 101.

A database director, such as database director 152 and 162, dynamically manages and adjusts the allocation of resources of a database between services hosted by the database instances of the database. One measure a database director uses to perform this responsibility is to perform incremental runtime session balancing between the database instances of a database as described in Incremental Run-Time Session Balancing in a Multi-Node System (50277-2411). Incremental runtime session balancing migrates the database sessions of a service between databases instances hosting the service. Another measure that can be undertaken by a database director is service expansion.

A cluster director, such as cluster director 112, manages and adjusts allocation of resources between databases. One measure a cluster director undertakes to perform this responsibility is to add or remove a database instance for a database to or from an existing node within a cluster.

A farm director, such as farm director 102, manages and adjusts allocation of resources between clusters. One measure a farm director undertakes to perform this responsibility is to add or remove a node to or from a cluster.

The directors detect violations of service-level agreements, herein referred to as service-level violations. For example, database director 152 periodically analyzes performance metrics and determines that the average transaction time for FIN on instance 125 violates the service-level agreement based on this measure.

Illustrating Service Placement Decisions Using a Database Director

As mentioned before, service placement and decision making can occur under various scenarios. A procedure followed by a database director to detect and remedy service-level violations is used herein to illustrate an example of a service placement and decision making.

According to an embodiment, a database director remedies a service-level violation it detects by initially making adjustments to resource allocations that are less disruptive and costly before resorting to more disruptive and costly resource allocations. Migrating database sessions of a service between the database instances of a database that are hosting the service is in general less disruptive and costly than expanding the service to another database instance.

Figure 2:
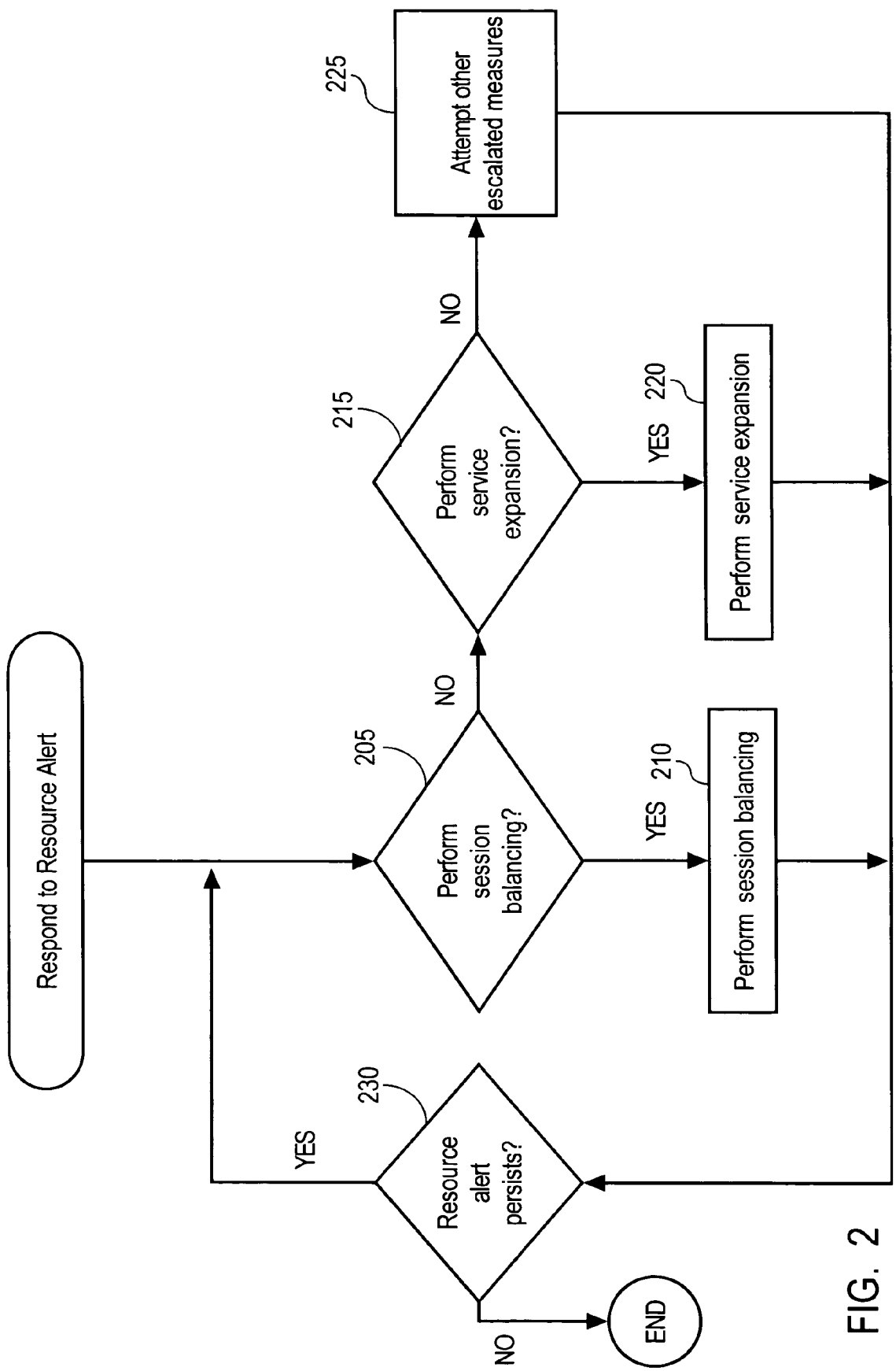
FIG. 2 is a flow chart showing a procedure for managing the escalation of remedies employed to resolve violations of service-level agreements.

FIG. 2 shows a procedure that may be used to manage the escalation of remedies employed to resolve service-level violations. The procedure is performed by a database director in response to detecting a resource alert for a database instance. A resource alert is the detection of a condition or event which triggers attention to resource allocation within a multi-node computer system. Resource alerts include, in particular, detection of service-level violations. A resource alert for a database instance can be the detection of a service-level violation for a database instance as a whole or for a particular service hosted by the database instance. For example, a resource alert can be detecting that the average transaction time for service FIN on database instance 125 exceeds the service-level agreement for this measure.

Referring to FIG. 2, at step 205, the database director first determines whether to attempt run-time session balancing. This determination is made by determining whether there are any candidate services on a source database instance for which session balancing can be performed. Typically, the source database instance is the database instance on which the service-level violation underlying the resource alert occurred. Incremental Run-Time Session Balancing In A Multi-Node System (50277-2411) describes an approach for determining whether there are any candidate services on a source database instance for which session balancing can be performed. If it is determined that session balancing should be performed, then at step 210 session balancing is performed.

At step 230, a determination is made of whether the resource alert persists. If a remedy invoked in an iteration of the procedure, such as session balancing, resolves the root cause of the resource alert, then the resource alert may no longer persist. Execution of the procedure ends.

If however, the resource alert persists, another iteration of the procedure is performed to undertake another remedy. Step 230 is performed after each iteration to assess whether a remedy taken in the iteration has resolved the resource alert or whether another iteration of the procedure should be performed.

If, at step 205, the determination is that run-time session balancing cannot be attempted, then the procedure determines at step 215 whether service expansion should be attempted. This determination is made by ascertaining whether there are any candidate services on the source database instance which can be expanded, as explained in greater detail below. If the determination is that service expansion should be performed, then at step 220 service expansion is performed, and the procedure returns to step 230.

If the determination is that service expansion should not be performed, then at step 225, resolution of the resource alert is escalated to more costly remedies. Such remedies include, for example, adding another node to the cluster hosting the source database instance and provisioning another database instance to the node, which are actions that may require participation of other directors.

Service Expansion

Figure 3:
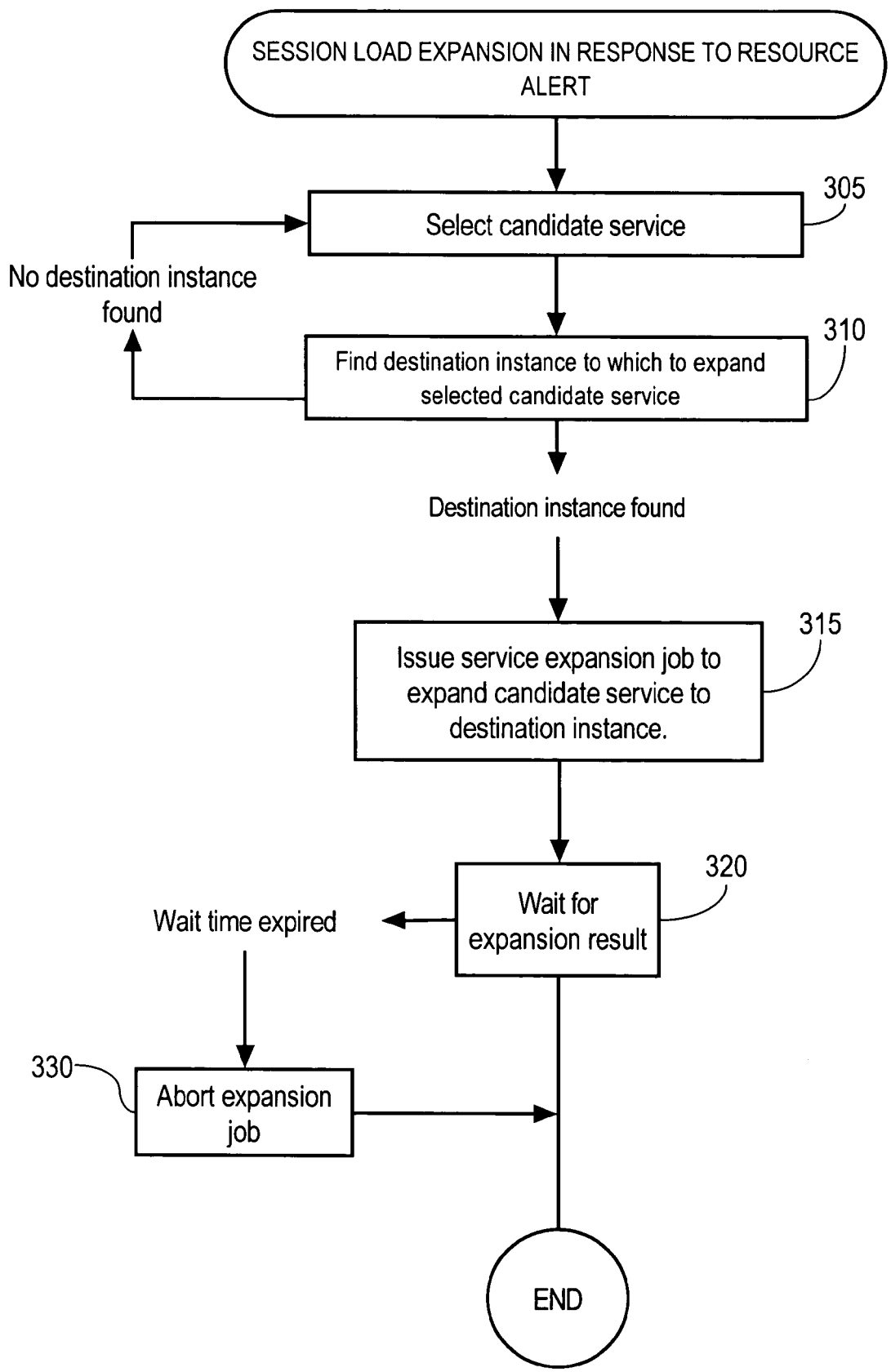
FIG. 3 is a flow chart showing a procedure for expanding a service to another database instance according to an embodiment of the present invention.

FIG. 3 depicts a procedure for service expansion and placement decision making. According to an embodiment of the present invention, service expansion is performed to expand one or more target services hosted on a "source database instance". A service to expand is referred to herein as a target service, and the database instance to which it is expanded is referred to herein as the destination database instance or destination instance. A procedure for finding a destination instance to which to expand a service is depicted in FIG. 4.

Referring to FIG. 3, at step 305, a candidate service is selected from among the services hosted on the source instance. The selection order may be based on the CPU utilization of services, where services with greater CPU utilization are selected before services with less CPU utilization. Alternatively, the selection order may be based on a priority established for the services. The services that may be selected include the service experiencing the service-level violation that underlies the resource alert.

At step 310, an attempt is made to find a destination instance to which to expand the candidate service. The step is performed by invoking the find expansion destination procedure depicted in FIG. 4. If the find expansion destination procedure is unable to find a destination instance, step 305 is repeated again to select another candidate service.

Figure 4:
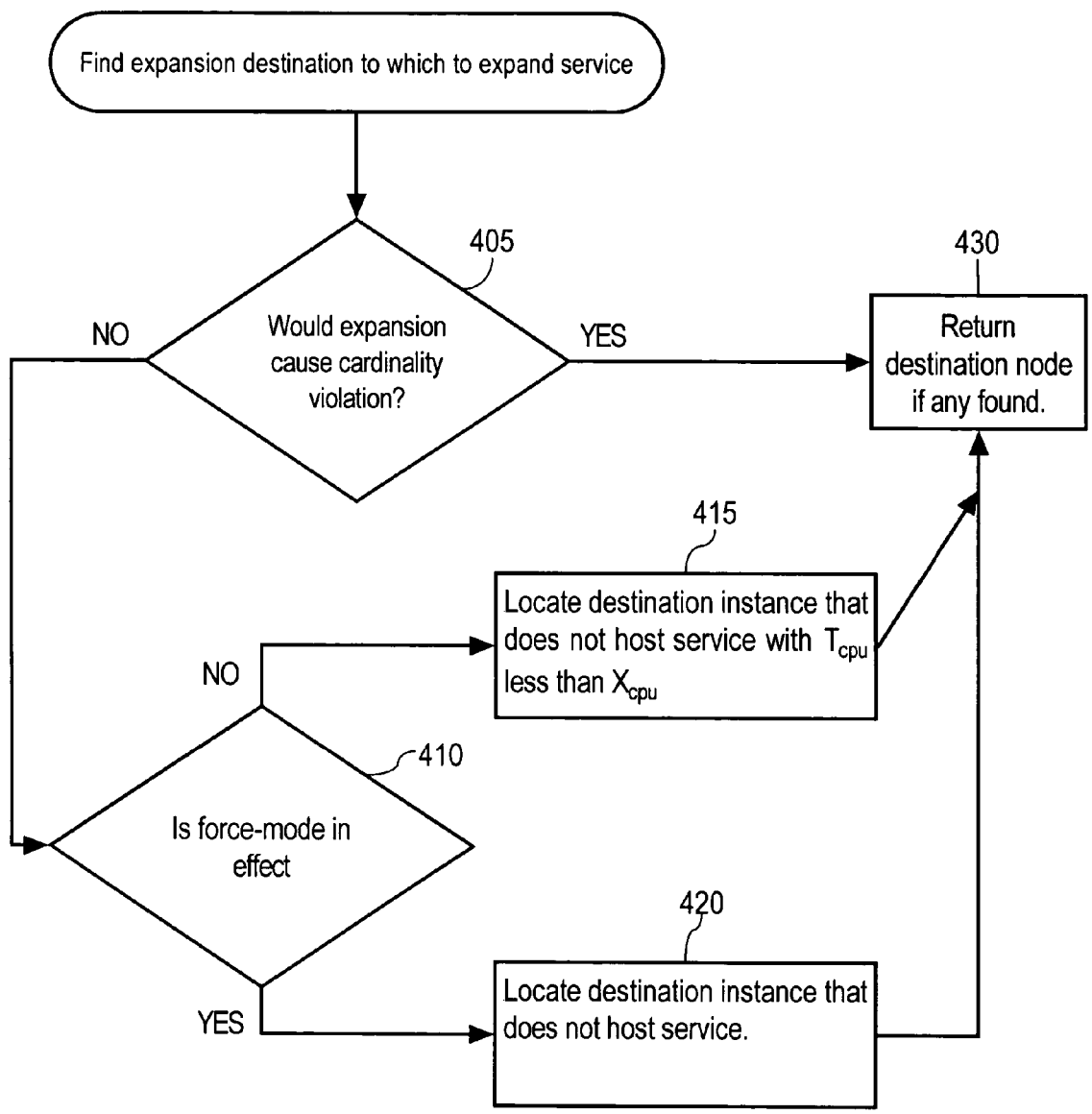
FIG. 4 is a flow chart showing a procedure for finding a destination instance to which to expand a service according to an embodiment of the present invention.

Referring to the find expansion destination procedure depicted in FIG. 4, at step 405, it is determined whether expanding the candidate service violates a cardinality constraint for the service. If so, then the find expansion destination procedure returns no instance as a destination instance, and the procedure ends. If it is determined that expanding the candidate service does not violate a cardinality service-level agreement for the service, the procedure proceeds to step 410.

At step 410, it is determined whether force-mode is in effect. If force-mode is in effect, then at step 420, a destination instance not already hosting the candidate service is found, if any. However, if force-mode is not in effect, then at step 415, a destination instance having $T_{cpu}$ less than $X_{cpu}$, is found, if any. The selected destination instance must also not be hosting the service. Force-mode may be set (i.e. made to be in-effect) when expanding a service to meet an availability requirement. Setting force-mode gives precedence to availability over CPU utilization. In force-mode, a poorly performing destination instance with $T_{cpu} > X_{cpu}$ may be selected as a destination instance to satisfy an availability requirement.

Various criteria may be used to select a destination instance in steps 415 and 420. For example, a destination instance with a lower $T_{cpu}$ may be selected before one with a higher $T_{cpu}$. Some services perform well together or not so well when hosted on the same database instance. For example, some services may access the same set of data in a database, increasing the likelihood that data accessed for either service is stored in the cache of a database instance. A service that performs well on a database instance because another service is hosted on the database instance has an affinity for the other service. Thus, when selecting a destination instance to expand a service, the destination instance can be selected to co-locate services with affinities for each other. Similarly, a destination instance may be selected in a way that accounts for services that perform worse when co-located on the same database instance.

Information about service affinity may be supplied by human database administrators of a database server.

At step 430, a database instance located in either of steps 415 or 420, if any, is returned by the procedure. The database instance located becomes the destination instance. The candidate service for which the find expansion destination procedure was invoked becomes the target service.

If a destination instance was found by the find expansion destination procedure, than at step 315, an expansion job is issued. The expansion job sends a service expand message to listener 190 signaling that the destination instance is now hosting the target service. In response to a subsequent client database connection request for the service, listener 190 has the option of creating a database session to be established for the client on the destination instance. In this way, the database instance is allocated to the service.

Issuing an expansion job creates a job that executes on the node hosting the destination instance and communicates with listener 190 and that executes asynchronously with the database director. This frees the database director from the task of communicating with listener 190. Such communication may involve inter-process communication and attendant delays in execution. Thus, delegating this task to the asynchronous job insulates the database director from such delays and allows the database director to continue performing its responsibilities, such as processing other resource alerts.

At step 320, the database director waits for the expansion result from the job process. The database director waits for a time-out period. If the database director does not receive a result within the time-out period, the procedure proceeds to step 330, where the expansion job is aborted.

Execution of the session expansion procedure ends.

While the database director waits for the expansion result, it is not idle. Rather, the database director may perform the procedure in FIG. 2 for another resource alert, such as a service-level violation for another service.

Post Service Expansion

At this stage, no database sessions are migrated to the destination instance. If the expansion procedure is performed within an iteration of the procedure depicted in FIG. 2, then a next iteration may invoke session balancing, migrating database sessions for the target service to the destination instance.

For example, a database director detects a service-level violation for service FIN on database instance 125, causing a resource allocation alert. In response, the database director begins execution of the procedure depicted in FIG. 2, causing service FIN to be expanded to database instance 127. At this stage, no database sessions for service FIN have been migrated to database instance 127 to transfer workload from database instance 125. As a result the service violation for service FIN persists, as determined at step 230. At step 205, it is determined that session balancing can be performed. Specifically, the database director determines that service FIN is a candidate for session balancing with database instance 127 as the destination for migrated sessions. Database sessions are then migrated from database instance 125 to database instance 127, thereby reducing workload on database instance 125 and remedying the cause of the resource alert.

In the current example, the service violation may abate or disappear without the database director ever having to migrate database sessions to database instance 127. It is possible that the load placed by database sessions on database instance 125 has abated because work performed within the database sessions has decreased or the database sessions have been terminated by clients. Furthermore, database connection requests for service FIN received after session expansion have been directed by listener 190 to database instance 127 rather than database instance 125.

The approach depicted in FIGS. 3 and 4 for selecting a target service and destination instance is illustrative but not limiting. For example, a function can be invoked to return a target service and/or destination instance. Such a function could return one or more target services and destination instances. The input to such a function could include data about the candidate services on the database instance experiencing the service-level violation, the CPU utilization of each of the services, other database instances hosting the candidate services, and CPU utilization of services on other database instances. The functions could implement a variety of approaches and policies for determining the target service and destination instance. Further, such a function could be user-supplied, that is, could be functions that are not part of the native software of a database server and but are registered with the database server to be invoked for the purpose of determining target services and destination instances.

Selecting a Target Instance for Service Contraction

Sometimes the cardinality of a service within a database needs to be reduced, that is, the number of instances of a database allocated to host the service needs to be decreased. For example, a service is hosted on a number of database instances equal to the maximum cardinality for the service. Meanwhile, a database administrator reduces the maximum cardinality by 1, triggering a cardinality violation. In response, a database director must select a database instance on which to quiesce a service.

The term quiesce refers to disabling a use of a server by a set of clients of the server. Quiescing a service refers to disabling the use of a database instance for that service. Quiescing a service on a database instance can entail preventing new connections to the database instance for that service and transferring work being performed for the service to another database instance via, for example, session migration.

Figure 5:
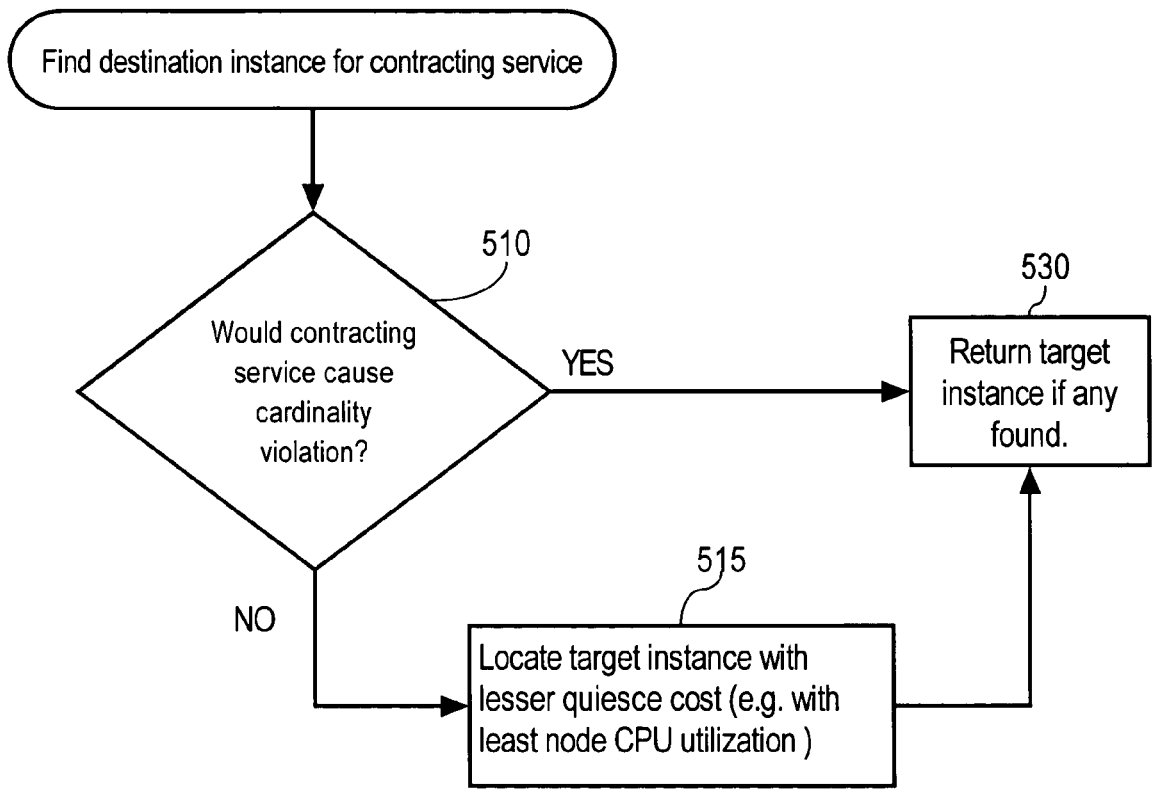
FIG. 5 is a flow chart depicting a procedure for finding a target instance from which to remove a service according an embodiment of the present invention.

FIG. 5 shows a procedure that may be performed by a database director to select a target database instance on which to quiesce a "target service". At step 510, it is determined whether reducing the cardinality of the service violates a minimum cardinality constraint. If so, then the procedure returns no target database instance. Otherwise, execution flows to step 515.

At step 515, the database director selects a database instance with the least quiescing cost. One factor that affects this cost is CPU utilization. Database instances on nodes with relatively less CPU utilization have less quiesce cost. Another factor that affects quiesce cost is the number of database sessions hosted by a database instance for a service. Part of quiescing a service on a database instance may entail migrating database sessions from a database instance. The cost of quiescing is less if there are less database sessions to migrate. Yet another factor to consider is whether the CPU utilization of a database instance violates service-level agreements. If the database instance has comparatively less database sessions than other database instances for the service, selecting the database instance not only reduces quiescing cost but reduces workload on a node where such relief is needed.

Hardware Overview

Figure 6:
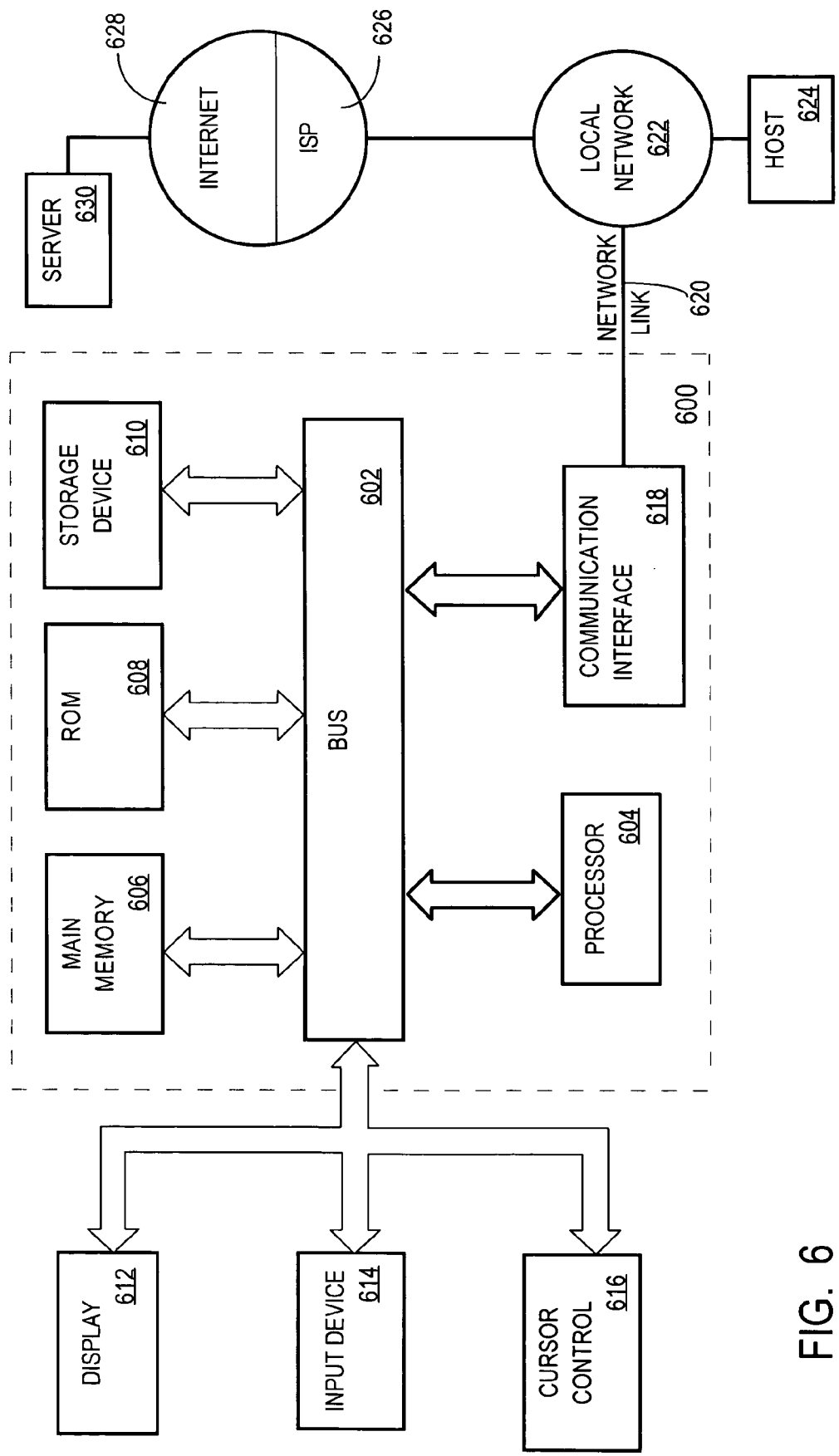
FIG. 6 is a block diagram of computer system that may be used in an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing resources in a multiple node system, the method comprising the steps of:
a plurality of servers hosting a service of a plurality of services,
wherein each server of said plurality of servers is hosted on a particular node of said multiple node system and comprises integrated software components executed by at least one process running on said particular node, wherein each node of said multiple node system is a computing element interconnected to at least another node of said multiple node system;
wherein each service of said plurality of services is performance of work of a particular type;
detecting a violation of a service-level agreement of a plurality of service-level agreements;
in response to detecting the violation, determining whether a first service of said plurality of services may be hosted by a first server of said plurality of servers that is not already hosting said first service; and
if said first service may be hosted by said first server, then causing said first server to host said first service.

2. The method of claim 1, the steps further including:
selecting said first service based on a performance measure associated with each service of said plurality of services; and
wherein selecting at least one service causes said determining whether a first service of said plurality of services may be hosted by a first server of said plurality of servers not already hosting said first service.

3. The method of claim 2, wherein said performance measure is based on CPU utilization by said each service.

4. The method of claim 2, wherein said performance measure is based on a number of servers hosting said service.

5. The method of claim 2, wherein selecting said first includes invoking a user-supplied routine that returns a certain server to host said first service.

6. The method of claim 1, wherein selecting at least one server of said plurality of servers includes selecting at least one server of said plurality of servers based on a performance measure associated with each server of said plurality of servers.

7. The method of claim 6, the steps further including causing a service-level agreement to be ignored when selecting at least one server of said plurality of servers based on a performance measure.

8. The method of claim 6, wherein selecting at least one server of said plurality of servers based on a performance measure includes selecting another server based on data that indicates that the first service performs better when co-located with a particular service on said other server relative to other services.

9. The method of claim 6, wherein said performance measure is based on CPU utilization of said each server.

10. The method of claim 1, wherein:
the steps further include, in response to detecting the violation, determining not to perform session balancing between at least one of said plurality of services and another of said plurality of servers; and
the step of determining whether a first service of said plurality of services may be hosted is performed in response to determining not to perform session balancing.

11. The method of claim 10, wherein the steps further include after performing the step of causing said first server to host said first service:
determining that said violation persists; and
determining whether to perform session balancing between at least one of said plurality of services and another of said plurality of servers.

12. The method of claim 1, wherein the steps further include:
after performing the step causing said first server to host said first service, determining that said violation persists; and
wherein determining that said violation persists causes sessions to be migrated from another server of said plurality of servers to said first server.

13. The method of claim 1, wherein each server of said plurality of servers manages access to a database.

14. The method of claim 1, wherein:
the plurality of servers execute on a set of nodes with each node having shared access to a non-volatile storage; and
each node of said set of nodes accesses a data item stored on said non-volatile storage without requiring another node access said data item on said each node's behalf.

15. A method for managing resources in a multiple node system, the method comprising the steps of:
a plurality of servers hosting a service of a plurality of services,
wherein each server of said plurality of servers is hosted on a particular node of said multiple node system and comprises integrated software components executed by at least one process running on said particular node, wherein each node of said multiple node system is a computing element interconnected to at least another node of said multiple node system;
wherein each service of said plurality of services is performance of work of a particular type;
detecting a violation of a service-level agreement of a plurality of service-level agreements;
in response to detecting the violation, selecting a server of said plurality of servers to cease hosting a first service of said plurality of services;
wherein said selecting the server is based on one or more factors that indicate the cost of causing said server to cease hosting said first service; and
in response to selecting the server, causing said server to cease to host said service.

16. The method of claim 15, wherein the one or more factors are based on one or more performance measures.

17. The method of claim 16, wherein the one or more performance measures include CPU utilization for the service.

18. The method of claim 16, wherein the one or more performance measures is based on a minimum cardinality established for said first service.

19. The method of claim 16, wherein the one or more factors include a number of sessions on said server that is associated with said first service.

20. The method of claim 16, wherein the step of selecting a server of said plurality of servers to cease hosting a first service includes invoking a user-supplied routine that returns a certain server to cease hosting said first service.

* * * * *

UNITED STATES PATENT AND TRADEMARK OFFICE
CERTIFICATE OF CORRECTION

| | |
|---|---|
| PATENT NO. | : 7,437,460 B2 |
| APPLICATION NO. | : 10/918056 |
| DATED | : October 14, 2008 |
| INVENTOR(S) | : Chidambaran et al. |

It is certified that error appears in the above-identified patent and that said Letters Patent is hereby corrected as shown below:

On page 2, in column 2, under "Other Publications", line 41, delete "Dec. 12003" and insert -- Dec. 1, 2003 --, therefor.

In column 14, line 52, in claim 5, after "first" insert -- service --.

Signed and Sealed this

Thirteenth Day of April, 2010

David J. Kappos
*Director of the United States Patent and Trademark Office*